DRIVE CIRCUIT UTILIZING LINEAR CORES TO CONTROL SWITCHING

Filed Oct. 28, 1965

INVENTOR
J. R. CONRATH
BY
William H. Kamstra
ATTORNEY

United States Patent Office 3,435,436
Patented Mar. 25, 1969

3,435,436
DRIVE CIRCUIT UTILIZING LINEAR CORES TO CONTROL SWITCHING

Jules R. Conrath, Salisbury Township, Lehigh County, Pa., assignor to Bell Telephone Laboratories, Incorporated, New York, N.Y., a corporation of New York Filed Oct. 28, 1965, Ser. No. 505,485
Int. Cl. G11b 5/12, 5/00
U.S. Cl. 340—174 13 Claims This invention relates to magnetic memory systems, and particularly to electrical drive conductors adapted to obtain access to the information addresses of such memory systems during writing and reading.

Access drive conductors employed in magnetic memory systems have taken a number of forms, each being dictated by the particular structure of the magnetic information storage elements employed. Thus, where toroidal magnetic cores comprise the individual bit addresses the drive conductors are conveniently threaded through a sequence of cores in series to achieve single-turn windings at each core. Where the storage elements comprise segments of magnetic memory wires or arrangements of magnetic thin films, it is also known to couple a drive conductor in the form of a flat strip solenoid to each of the magnetic bit locations by passing the strip solenoid in one direction on one side of a sequence of addresses and returning it in the opposite direction on the other side. The solenoid is thus twice coupled to each magnetic bit element and is further formed in a closed loop, one end being conventionally coupled in turn to a source of drive pulses such as a toroidal magnetic core. The latter core, in a well-known practice, comprises one of a matrix of such cores making up an access switch.

The selection of a core in the access switch and the resulting drive current in its coupled solenoid generate a magnetic field about both sections of the solenoid for its entire length. In the conventional practice, the fields thus generated are effective at each magnetic bit address to operate upon the magnetic flux state of the memory element in accordance with the particular operation being performed. In a word-organized magnetic memory employing magnetic memory wires, for example, the generated fields may cooperate at a bit storage segment during readout to switch the flux state of the segment. A signal induced in the memory wire as a result of the flux switching is then detected as indicative of the information bit stored in the address segment. In a write access operation, the solenoid current may cooperate with a selection current coincidently applied to the memory wire to change the flux state of an address segment.

The effective influence of the fields produced by a drive solenoid is determined both by the width of the solenoid strip and the magnitude of the drive current applied thereto. In many prior art arrangements the field distribution is permanently set sufficiently wide by a fixed solenoid width to cause the desired flux switching in an address segment. Where a bit segment is to be completely switched, for example, the field distribution may be adjusted to switch a bit segment of sufficient length to maintain a stable remanent flux state. In one magnetic memory wire arrangement, on the other hand, different field strengths are required for reading and writing. In the patent of W. A. Barrett, Jr., No. 3,067,408, granted Dec. 4, 1962, for example, a bit address is described which comprises an electrical conductor having two magnetic tapes helically wound therearound. The tapes conventionally are of a magnetic material displaying substantially rectangular hysteresis characteristics. The tapes, however, have different coercive forces so that the flux established in a segment of the higher coercive force tape closes through a path including a segment of the adjacent lower coercive force tape. The flux in the higher coercive force tape dominates the flux state of the adjacently coupled segment which advantageously makes possible a highly practicable nondestructive readout.

In this arrangement, the coupled access drive solenoid is energized during writing with sufficient current to generate a drive field which, in combination with the bit selection fields, is able to switch the coupled segment of the higher coercive force tape. At the termination of the drive currents, the closing field of the dominant higher coercive force segment assumes control of the flux state of the secondary segment. The flux states of both the dominant and secondary segments are thus representative of a stored binary information value. This value is nondestructively read out of the address by energizing the solenoid with current sufficient to generate a field capable only of switching the magnetic state of the secondary address segments, overriding the dominating field of the higher coercive force segment. The termination of the readout drive permits the dominant field of the latter segment to restore the secondary segment to its preread flux state without the expenditure of additional power.

In the foregoing arrangement an advantageous mode of readout contemplates the flux switching, not of the entire secondary bit segment, but only of a central portion therein, at which portion the segment of the lower coercive force tape is the most strongly magnetized. In order to achieve such a localized flux switching as contrasted to the switching of the entire bit segment of both tapes which may occur during writing, it is obviously necessary to confine the switching field to the localized area of the bit segment. It is an object of this invention to achieve drive fields of different distributions which may be selectively applied to a magnetic memory address, where such fields are required, for writing and readout. Although apparatus may be envisioned in which separate and distinct pulse sources and solenoids are provided to achieve fields of different distributions, it is also an object of this invention to provide a solenoid construction which is coupled to a single core of an access switch to obtain its current energization.

A further object of this invention is to provide a new and novel dual purpose drive solenoid construction which advantageously lends itself to fabrication in single encased tape structure.

The foregoing objects of this invention are realized in one specific embodiment thereof in which a flat strip solenoid is divided into three longitudinal sections. Each of the solenoid strip sections is formed into a closed loop in the conventional fashion and is coupled at one end to the same toroidal core, which core comprises one of a plurality making up a coordinate array biased core access switch. The outer sections of the solenoid construction each have coupled therein a saturable core means which, during the operation of the circuit, perform the selection between the two available field distributions. In one advantageous alternate construction, a single saturable core may be coupled to both outer sections of the solenoid, conveniently at the end opposite from that of the access switch core.

During a read cycle of the memory in which the foregoing construction may be adapted for use, the access core coupled to the solenoid sections is selected by means of cumulative currents of short duration. As a result, the center section of the solenoid, which is coupled to the access core alone, is normally driven by the output of the selected access core. The saturable cores on the outer sections of the solenoid, which are of relatively high permeability and short magnetic path, on the other hand, limit the current induced in these outer sections to a relatively small value. An effective magnetic field is thus generated about the center section of the solenoid whereas negligible fields are generated about the outer sections. For readout, a drive field is thus concentrated at a localized central portion of the memory address, in the case of magnetic memory wires, in the central portion of an address segment. In the alternate arrangement mentioned in the foregoing, the characteristics of the single saturable core are determined to perform the same current limiting function as the two core embodiment. By thus switching only the portion of an address segment where the magnetization is the strongest, an improved discrimination between the desired information-representative output signals and shuttle signals is advantageously realized.

When a bit address or addresses are to have information written therein by a coupled solenoid according to this invention, a relatively longer total selection current pulse is applied to the coupled access core. Initially, the current limiting saturable cores coupled to the outer sections of the solenoid will have the same effect as during a read operation. That is, the current will be held to a relatively small value as compared to that present in the center section of the solenoid. However, after a short delay the limiting cores will saturate and substantially the same current will exist in all three sections of the solenoid. As a result, cooperating fields will be generated about the three-section solenoid which are effective to switch or otherwise operate upon the magnetic state of the entire magnetic bit address. The size and characteristics of the limiting cores are chosen so as to inhibit current in the outer sections of the solenoid sufficiently long to achieve a suitable read drive but not so long as to require excessive access core drive duration.

It is thus a feature of this invention that a flat strip drive solenoid of a magnetic memory be divided into three longitudinal sections, each coupled to the same core of the associated access switch. Different currents are achieved in the two outer sections as compared with the current in the center section during an access operation by means of saturable core elements coupled to the outer sections alone. The saturable cores limit the current in the solenoid to the center section when the access core produces a short drive current and permit, after they become saturated, substantially the same current in all three sections when the access core produces a relatively longer drive current. Selection between drive field distributions is thus advantageously achieved.

The foregoing and other objects and features of this invention will be better understood from a consideration of the detailed description of specific illustrative embodiments thereof which follows when taken in conjunction with the accompanying drawing in which.

Figure 1:
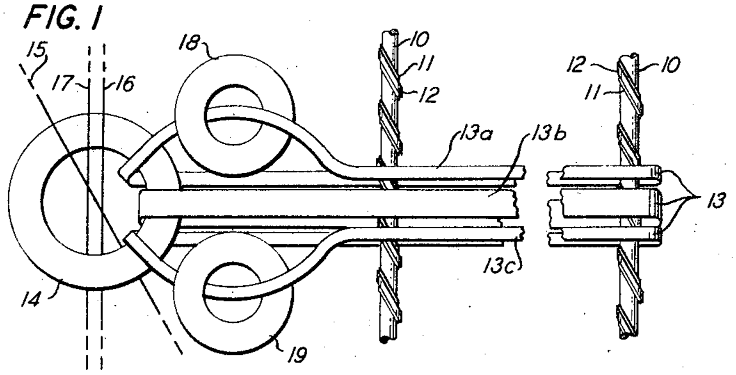
FIG. 1 depicts one specific drive solenoid assembly according to the principles of this invention showing two representative magnetic wire memory elements for purpose of illustration.

FIG. 1 of the drawing shows one illustrative drive solenoid assembly according to this invention which is advantageously adapted to perform access operations in a magnetic memory employing magnetic wire memory elements as the storage components. Since such memory arrangements are well known in the art only a single word line of information addresses is depicted in the drawing. Also only two portions of the memory elements are included as representative of any number of such elements which may comprise the bit lines accessed by a solenoid assembly. For purposes of illustration, the particular memory elements chosen to be associated with the drive solenoid each comprises a central electrical conductor 10 having helically wound therearound a first magnetic tape 11 of a material having substantially rectangular hysteresis characteristics. A second magnetic tape 12 having the same characteristics is wound substantially centrally on the tape 11. The tapes 11 and 12 are determined to have differing coercive forces, the tape 11, shown as the narrower tape for purposes of contrast only, having a lower coercive force than the tape 12. The operation as memory elements of the combination of conductors and tape cores is well known and is described in the aforementioned patent of Barrett, for example.

A flat strip solenoid assembly 13 is inductively coupled to a segment of each of the tapes 11 and 12 of the memory elements assumed to be associated therewith and the assembly 13 defines on the memory elements the information bit address segments of the memory. The solenoid assembly 13 is divided into three parallel sections **13*a*, 13*b*, and 13*c*, insulated from each other and shown as broken in the drawing to indicate the larger extent of the assembly in practice. The sections 13*a*, 13*b*, and 13*c* are formed as closed loops which encircle the memory elements, passing in one direction on one side of the elements and returning in the opposite direction on the other side of the elements. Each of the sections of the solenoid assembly 13 is inductively coupled to a magnetic core 14. The core 14 is understood to constitute one of the cores of a well-known coordinate array biased core access switch serving the memory with which the solenoid assembly of this invention is adapted for use. Thus, the core 14 has coupled thereto X and Y selection conductors 15 and 16 defining the rows and columns of the access switch. In addition, a biasing conductor 17 also links the core 14**.

In accordance with the principles of this invention, the sections **13*a* and 13*c* of the solenoid assembly 13 are also inductively coupled to a pair of cores 18 and 19, respectively. In the embodiment of this invention depicted in FIG. 1, the cores are advantageously positioned at the same side of the memory as the access core 14. In an alternate arrangement and one in which an economy in the number of cores 18 and 19 is achieved, the function thereof is performed by a single core 18' positioned at the opposite side of the memory from the access core 14'**. It will be appreciated that the particular advantages offered by each embodiment will determine which is elected for use in a specific memory application.

In the illustrative memory in connection with which the solenoid assembly of this invention is being described, a remanent flux state in an address segment of the higher coercive force tape 11 controls the direction of the flux in the corresponding address segment of the tape 12, the flux of the tape 11 being closed through the former tape. The flux states in both segments are thus representative of an information value and in accordance with the operation of such memory elements, this information value may be nondestructively read out. A readout field applied to the address segments of sufficient magnitude to switch the lower coercive force tape without being great enough permanently to affect the higher coercive force tape performs the readout operation. As the lower coercive force address segment is flux switched—if the information value there stored corresponds to a switchable flux state—a signal is induced in the coupled electrical conductor 10 and is detected by circuitry not shown in the drawing in a known manner. When the interrogating field is removed, the flux in the higher coercive force segment reassumes control, restoring the lower coercive force segment to its preread state. Conventionally, where the stored information is represented in the lower coercive force address segment by a magnetic flux state which is already in the direction of the applied interrogating field, only a shuttle signal will be generated in the conductor 10.

In the practice of the foregoing memory systems it has been found that an improved discrimination between an output signal and shuttle signals is achieved when the lower coercive force tape segment is switched in its central area where its magnetization is the strongest, that is, in the area where the segment is most completely magnetically saturated. As a result, shuttle flux excursions are held to a minimum and a greater flux change results when the segment is switched by an interrogating drive. It follows then that the difference in amplitude between the shuttle signals induced in the memory element conductor and the output signals induced by a complete flux switching is increased. An improved discrimination between these signals is thus advantageously achieved.

With the foregoing organization of specific embodiments of this invention in mind an illustrative operation thereof may now be described. The operation to be considered applies to either of the embodiments of FIGS. 1 or 2 and is initiated for both a wire and a read cycle by the selection of the access core 14 within the coordinate array access switch of which the core 14 is understood to be part. Conventionally each of the cores of such an access switch is continuously biased in one direction of magnetic saturation by a current on the biasing conductor 17 from a source not shown in the drawing. The core 14 is selected by coincident selection currents applied to the selection conductors 15 and 16 also from sources not shown in FIG. 1. During a write cycle of operation it is necessary, in the memory system assumed for purposes of illustration in FIG. 1, that the address segment of the entire higher coercive force tape 11 be switched to set the magnetic state representative of a particular information value. Accordingly, the solenoid assembly 13 is required to produce a field which is distributed over the length of the bit segment. Selective writing among the plurality of bit addresses understood to be served by the solenoid assembly 13 is accomplished in conjunction with selective bit write currents applied to the conductors 10 in accordance with the character of the particular information to be stored in the exemplary word line of FIG. 1. However, since this invention is concerned primarily with the novel operation of the solenoid assembly 13 rather than with the conventional operation of bit selection, circuitry for accomplishing the latter operation has been omitted from the drawing for the sake of simplicity.

Figure 3:
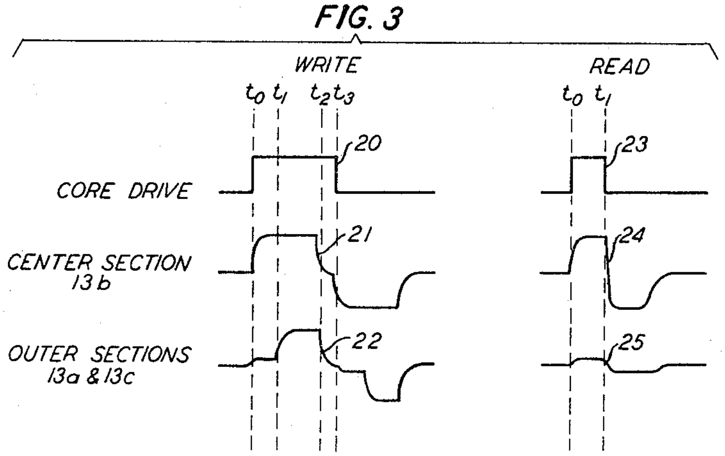
FIG. 3 is a chart comparing by means of idealized waveforms the currents present in various of the circuit elements of the embodiments of FIGS. 1 and 2 during a write and read operation.

In order to provide the field distribution about the solenoid assembly 13 required for the write operation, the selected access core 14 is driven by its selection circuitry by a total drive current at the time $t_0$ represented in FIG. 3 by the idealized positive pulse waveform 20. As a result of thus overcoming the bias of the core 14 and the flux excursion occurring therein, a current depicted in FIG. 3 as the alternating waveform 21 is induced in the center section **13*b* of the solenoid assembly 13. The current 21 is initially positive and also begins at the time $t_0$. When the drive current 20 is terminated at the time $t_3$, the current in the center solenoid section 13*b* goes negative, although in the memory arrangement assumed in FIG. 1 the latter alternation may be disregarded. In the outer sections 13*a* and 13*c* of the solenoid assembly 13 the response to the switching of access core 14 at the time $t_0$ is different. The cores 18 and 19 respectively coupled to these sections, as mentioned previously, are linear, high permeability elements and for a short time duration until these elements are saturated, present a high impedance to current in the coupled sections. Thus, from the time $t_0$ to the time $t_1$ the currents in the outer sections 13*a* and 13*c* are held to a low value as represented by the waveform 22 in FIG. 3. Once the linear cores 18 and 19 are saturated, the currents in the sections 13*a* and 13*c* build up to substantially the value of the current in the center section 13*b*. The induction of an opposite alternation is delayed and built up at the termination of the acess core drive pulse 20 at the time $t_3$ in a manner similar to the opposite alternation of the current 21**.

From the time $t_1$ to the time $t_2$ all three of the solenoid sections have substantially equal currents applied thereto with the result that the fields generated thereby combine for a field distribution over the length of the bit address segment defined on the high coercive force tape 11. Where bit selection fields generated by bit currents in the magnetic memory elements cooperate with the solenoid fields, additive flux switching drives are applied to the address segments defined by the solenoid assembly 13 to establish remanent fluxes in those segments representative of particular binary information in accordance with well known prior art practice. In accordance with the principles of this invention the solenoid assembly 13 thus operates as a conventional solenoid during the time period $t_1$ to $t_2$.

When the information stored in the word line of the memory circuit of FIG. 1 is to be read out, the access core 14 is driven by a total current on the selection conductors 15 and 16 which is of shorter duration than the the current 20 applied during a write operation and this read selection current is represented in FIG. 3 by the idealized positive pulse waveform 23 initiated at the time $t_0$ of a read cycle. As a result of the flux excursion caused thereby in the access core 14 in ocercoming its bias, a current is also induced in the center section **13*b* of the solenoid assembly 13 at the time $t_0$. This current is represented in FIG. 3 by the waveform 24 and also has a negative alternation at the termination of the access core drive at the time $t_1$. The linear cores 18 and 19 again, until their saturation, hold the currents in the outer sections 13*a* and 13*c* to a negligible value as represented in FIG. 3 by the waveform 25. Before their saturation is complete, however, the access core drive is terminated. As a result, current in the two outer sections is effectively prevented during the readout cycle. The only read field which is operative on the lower coercive force segments of the addresses is the field generated about the center section 13*b* by the current 24. This field is distributed over a localized central portion of the address segment on the tape 11** to switch the flux there established at its highest density to achieve the advantageous shuttle-to-output signal ratio previously noted.

Figure 2:
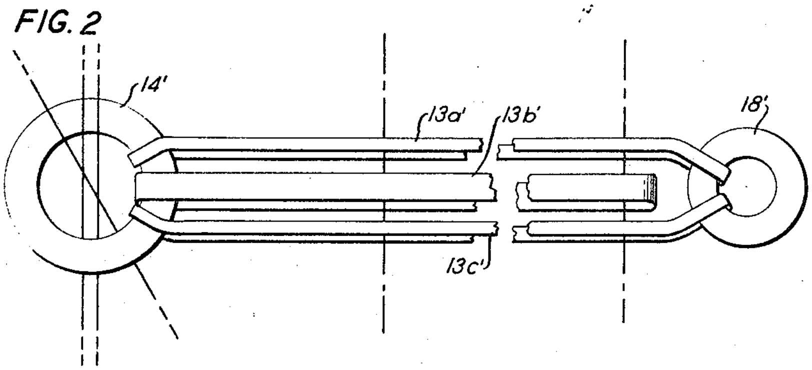
FIG. 2 depicts an alternate specific solenoid assembly of this invention.

The embodiment of this invention depicted in FIG. 2 is operated in a manner identical to that described for the embodiment of FIG. 1. In the former case, the single linear core 18′ performs the current selection function for the two outer sections **13*a* and 13*c* of the solenoid assembly 13. The elements of this invention depicted in the drawing and their physical relationship have been exaggerated for purposes of clarity. In practice, a solenoid assembly approximately 0.060 inch in width, with a center section of 0.030 inch and the outer sections each 0.15 inch in width was found suitable for driving a wire memory element having 92 turns of magnetic tape per inch. The linear core 18′ of the embodiment of FIG. 2 may be advantageously the same size as either of the identical cores 18 and 19 of the embodiment of FIG. 1 for achieving the same results, the total flux capacity of the two cores 18 and 19 or the core 18′ having approximately 40 percent the flux capacity of the access core 14 or 14′. A read pulse of approximately 2 microseconds duration and a write pulse of approximately 5 microseconds duration applied to the access core 14** was found sufficient to provide the necessary discrimination in the currents in the center and outer sections of the solenoid assembly.

It will be appreciated that, although the novel solenoid assembly of this invention was described as serving magnetic information storage elements comprising magnetic memory wires of one specific known type, other such memory wires may also be advantageously accessed by the solenoid assembly described. Further, other magnetic storage elements such as thin films, and the like, are also readily envisioned as being accessed in combination with the novel solenoid arrangement of this invention.

What have been described are considered to be only illustrative embodiments of this invention and it is to be understood that various and numerous other arrangements may be devised by one skilled in the art without departing from the spirit and scope of this invention as defined by the accompanying claims.

What is claimed is:

1. An access circuit for magnetic information storage devices comprising an access magnetic core, solenoid winding means having two outer and an inner parallel sections, each section being coupled to said access core and to said storage devices, means for applying switching drives to said access core for selectively inducing access currents in said winding means for a first time period and for a second, longer time period, and saturable core means coupled to said two outer sections of said winding means to inhibit said access currents in said last-mentioned sections during said first time period.

2. An access circuit as claimed in claim 1 in which said saturable core means comprises a core individual to each of said outer sections of said solenoid winding means.

3. An access circuit as claimed in claim 1 in which said saturable core means comprises a core common to each of said outer sections of said solenoid winding means.

4. An access circuit as claimed in claim 1 in which said magnetic storage devices comprise magnetic wire memory elements each comprising an electrical conductor having a magnetic tape of one coercive force and a magnetic tape of another coercive force helically wound therearound.

5. An access drive winding arrangement for accessing a plurality of coupled magnetic information storage devices comprising a plurality of flat strip electrical conductors lying substantially longitudinally parallel and coupled to said information storage devices, access means for applying simultaneous drive currents to said plurality of conductors for a first period and for a longer, second period, and saturable core means coupled to ones of said conductors lying on either side of a central one of said conductors, said saturable core means being adapted to become magnetically saturated after said first period by said drive currents.

6. An access drive winding arrangement as claimed in claim 5 in which said access means comprises an access magnetic core inductively coupled to each of said electrical conductors.

7. An access drive winding arrangement for accessing a plurality of coupled magnetic information storage devices comprising a first, second, and third flat strip electrical conductor adjacently positioned in magnetic coupling with said information storage devices, first access means for applying simultaneous currents to said conductors during one time period for generating magnetic fields about each of said conductors for one accessing operation, second access means for applying simultaneous currents to said conductors during a second time period, and means for inhibiting said currents in said first and third conductors to generate a magnetic field about only said second conductor for another accessing operation comprising saturable core means coupled to said first and third conductors, said core means becoming magnetically saturated only at the termination of said second time period and before the termination of said first time period.

8. An access drive winding arrangement as claimed in claim 7 in which said first and second access means includes an access magnetic core having substantially rectangular hysteresis characteristics coupled to said first, second, and third conductors and said saturable core means has linear, high permeability characteristics and a flux capacity less than the flux capacity of said access magnetic core.

9. An access drive winding arrangement as claimed in claim 8 in which said saturable core means comprises a separate core coupled to each of said first and third conductors.

10. In a magnetic memory system having a plurality of magnetic information storage devices, a drive winding arrangement comprising a first flat strip conductor, second and third flat strip conductors positioned parallel to and on either side of said first conductor, each of said first, second, and third conductors being coupled at one end to an access magnetic core and to each of said information storage devices, and a linear, high permeability, saturable core means coupled to said second and third conductors, said access core being switchable to cause a current in each of said conductors for a first and a second, longer duration, said core means being adapted to saturate magnetically only after said first duration effectively to inhibit currents in said second and third conductors in said first duration.

11. A drive winding arrangement as claimed in claim 10 in which said saturable core means comprises a magnetic core individual to each of said second and third conductors and coupled thereto at the access core end of said conductors.

12. A drive winding arrangement as claimed in claim 10 in which said saturable core means comprises a magnetic core common to each of said second and third conductors and coupled thereto at the ends of said last-mentioned conductors opposite from said access core.

13. In a magnetic memory system, drive means for generating magnetic fields of a first and a second field distribution comprising a first flat strip conductor having a width corresponding substantially to said first field distribution, second and third flat strip conductors positioned parallel to and on either side of said first conductor, said first, second, and third strip conductors having a combined width corresponding substantially to said second field distribution, a common access core coupled to each of said conductors, said access core being switchable to cause simultaneous currents in each of said conductors for one time period and for a second, longer time period, saturable core means coupled only to said second and third conductors, said core means being adapted to saturate magnetically only after said one time period to inhibit said currents in said second and third conductors during said one time period thereby to limit the field generated by said conductors to said first field distribution and to permit said currents in said second and third conductors after said one time period and during said second, longer time period to extend the field generated by said conductors to said second field distribution.

References Cited

UNITED STATES PATENTS

| | | | |
|---|---|---|---|
| 3,200,383 | 8/1965 | James | 340—174 |
| 3,361,913 | 1/1968 | Kaufman | 340—174 |
| 3,378,821 | 4/1968 | Leilich | 340—174 |

TERRELL W. FEARS, *Primary Examiner.*

VINCENT P. CANNEY, *Assistant Examiner.*

U.S. Cl. X.R.

307—88